United States Patent
Sun (10) Patent No.: US 11,027,384 B2
(45) Date of Patent: Jun. 8, 2021

(54) FAST TOOL CHANGING METHOD WITH PRE-UNCLAMPING PROCESS

(71) Applicant: Chen Sound Industrial Co., Ltd., Taichung (TW)

(72) Inventor: Ying Sun, Taichung (TW)

(73) Assignee: CHEN SOUND INDUSTRIAL CO., LTD., Taichung (TW)

( * ) Notice: Subject to any disclaimer, the term of this patent is extended or adjusted under 35 U.S.C. 154(b) by 15 days.

(21) Appl. No.: 16/026,508

(22) Filed: Jul. 3, 2018

(65) Prior Publication Data
US 2020/0009698 A1 Jan. 9, 2020

(51) Int. Cl.
*B23Q 3/157* (2006.01)
*B23Q 3/155* (2006.01)

(52) U.S. Cl.
CPC .......... *B23Q 3/15503* (2016.11); *B23Q 3/157* (2013.01); *B23Q 3/15713* (2013.01); *B23Q 3/1554* (2013.01); *B23Q 2003/155418* (2016.11); *B23Q 2003/155428* (2016.11); *B23Q 2003/155442* (2016.11); *Y10T 483/10* (2015.01); *Y10T 483/1767* (2015.01)

(58) Field of Classification Search
CPC ............. Y10T 483/10; Y10T 483/1748; Y10T 483/1752; Y10T 483/1755; Y10T 483/1767; Y10T 409/309408; Y10T 409/309464; B23Q 3/1554; B23Q 3/15503; B23Q 2003/155425; B23Q 2003/155428; B23Q 2003/155435; B23Q 2003/155439
See application file for complete search history.

(56) References Cited

U.S. PATENT DOCUMENTS

| | | | | |
|---|---|---|---|---|
| 4,833,772 A * | 5/1989 | Kobayashi | ......... | B23Q 3/15526 483/44 |
| 5,337,623 A * | 8/1994 | Huang | ................. | B23Q 3/1554 74/53 |
| 5,690,137 A * | 11/1997 | Yamada | ............... | B23Q 1/0036 137/240 |
| 5,752,905 A * | 5/1998 | Yan | ...................... | B23Q 3/1554 483/39 |
| 6,637,290 B2 * | 10/2003 | Kato | .................... | B23Q 3/1554 414/222.01 |
| 6,786,856 B2 * | 9/2004 | Kato | .................... | B23Q 3/1554 483/3 |

(Continued)

*Primary Examiner* — Erica E Cadugan
*Assistant Examiner* — Yasir A Diab
(74) *Attorney, Agent, or Firm* — Muncy, Geissler, Olds & Lowe, P.C.

(57) ABSTRACT

A fast tool changing method with pre-unclamping step for controlling operations of the spindle, tool unclamping cylinder, and tool changing arm. The spindle has one end clamping the tool at the clamping position. The method includes following steps. In a tool pre-unclamping step, the clamp end of the spindle moves the used tool to a pre-unclamping position; the tool unclamping cylinder pushes the used tool to leave a taper of the spindle. In a tool changing step, the tool changing arm rotates to clamp the used tool and pulls the used tool away from the clamp end, and further aligns a target tool with the clamp end. In a tool inserting step, the tool changing arm inserts the target tool into the clamp end, to be clamped therein. Therefore, the tool unclamping and tool clamping operations are accelerated.

6 Claims, 6 Drawing Sheets

(56) References Cited

U.S. PATENT DOCUMENTS

| | | | | |
|---|---|---|---|---|
| 7,070,550 | B1* | 7/2006 | Sun | B23Q 3/1554 |
| | | | | 483/39 |
| 7,367,097 | B2* | 5/2008 | Nakamura | B23B 31/261 |
| | | | | 29/27 C |
| 7,748,302 | B2* | 7/2010 | Kato | B23Q 5/341 |
| | | | | 82/117 |
| 9,463,544 | B2* | 10/2016 | Li | B23Q 3/1554 |
| 2002/0043123 | A1* | 4/2002 | Kato | B23Q 3/1554 |
| | | | | 74/431 |
| 2003/0114282 | A1* | 6/2003 | Kato | B23Q 3/1554 |
| | | | | 483/39 |
| 2010/0201083 | A1* | 8/2010 | Hangleiter | B23B 31/265 |
| | | | | 279/50 |
| 2011/0052342 | A1* | 3/2011 | Hongou | B23B 29/04 |
| | | | | 409/231 |
| 2011/0177925 | A1* | 7/2011 | Mayr | B23Q 1/4876 |
| | | | | 483/44 |
| 2011/0201484 | A1* | 8/2011 | Isozumi | B23Q 3/12 |
| | | | | 483/36 |
| 2017/0066093 | A1* | 3/2017 | Wakisaka | B23Q 3/1554 |

* cited by examiner

FAST TOOL CHANGING METHOD WITH PRE-UNCLAMPING PROCESS

BACKGROUND OF THE INVENTION

1. Field of the Invention

The present invention relates to tool changing methods, and more particularly, to a tool changing method with pre-unclamping process.

2. Description of the Related Art

Figure 1:
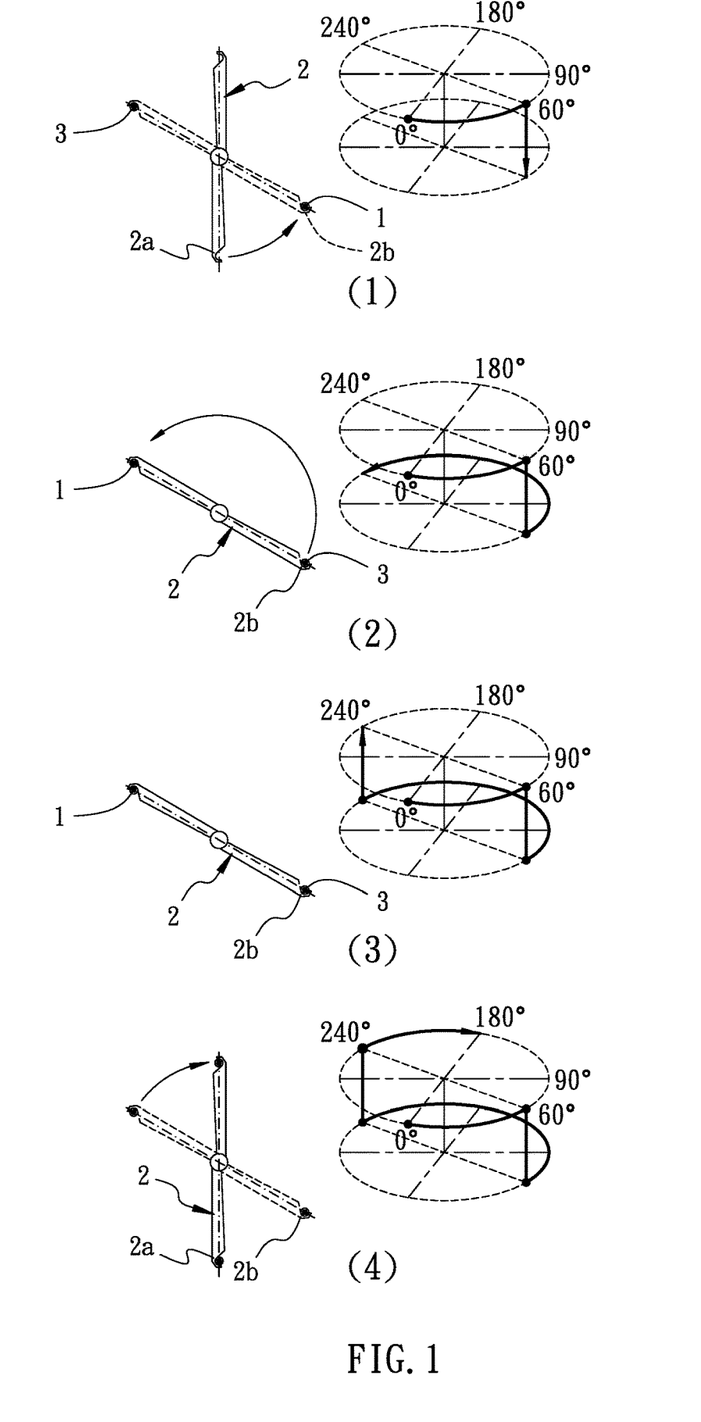
FIG. 1 is a schematic view illustrating the conventional tool changing operation procedure.
Figure 2:
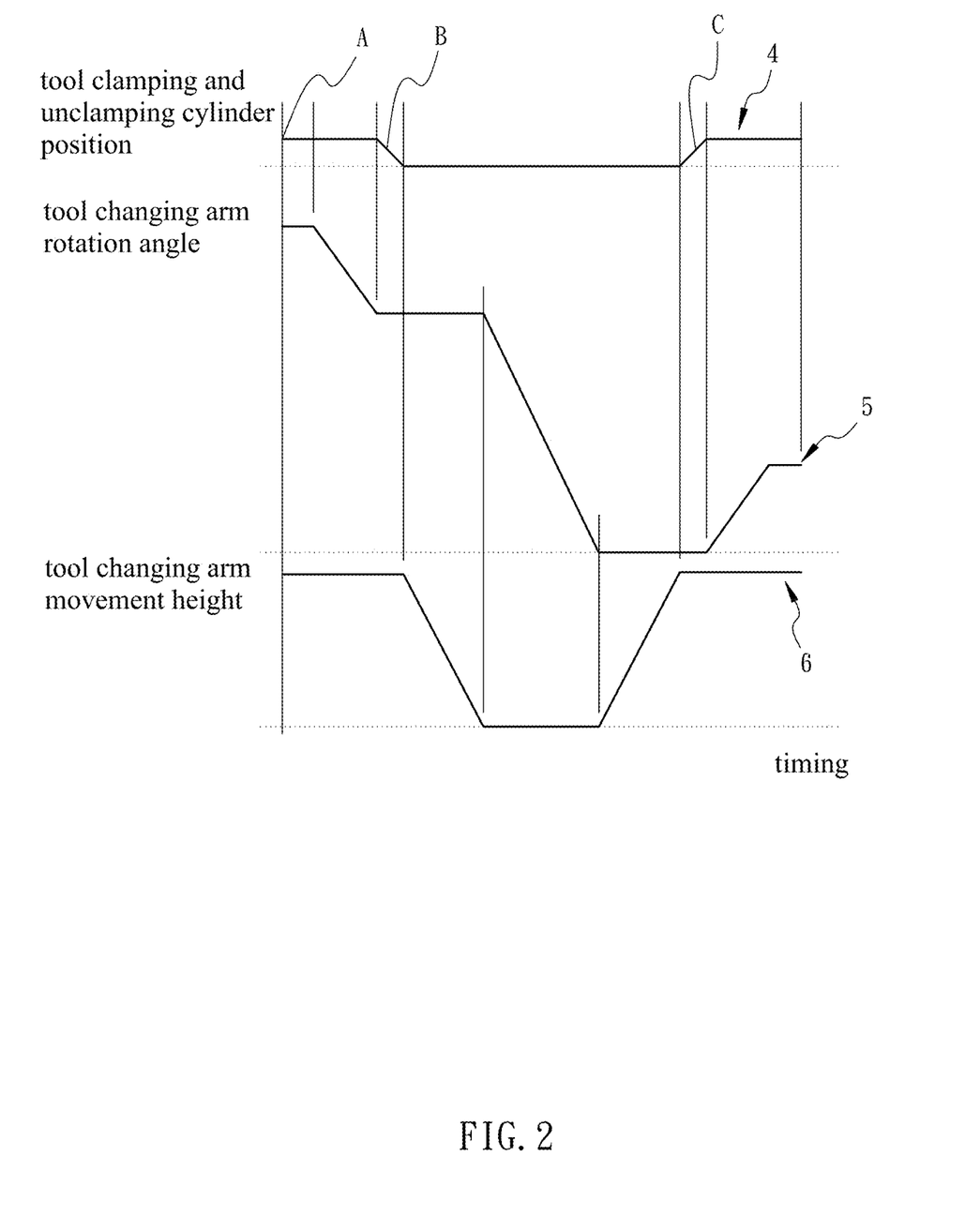
FIG. 2 is a timing diagram of the conventional tool changing operation procedure.

Referring to FIG. 1 and FIG. 2, a tool changing operation includes following steps. First in step (I), when the tool finishes the processing, the spindle drives the used tool 1 back to the original point A. When the spindle stops, the tool changing arm 2 rotates from the stand by position 2a to the spindle position 2b, such that one end of the tool changing arm 2 clamps the used tool 1, and the other end of the tool changing arm 2 clamps the target tool 3. Next, after the tool changing arm 2 clamping the used tool 1, the clamp end of the spindle carries out the unclamping motion B upon the used tool 1. Such step is illustrated as step (I) in FIG. 1. Next in step (II), the tool changing arm 2 pulls the used tool 1 away from the spindle, and the tool changing arm 2 rotates the target tool 3 to the clamp end of the spindle. The tool changing arm 2 inserts the target tool 3 into the clamp end of the spindle, which is illustrated as step (II) in FIG. 1. Next in step (III), after the target tool 3 being inserted into the clamp end, the spindle carries out the clamping motion C upon the target tool 3, which is illustrated as step (III) in FIG. 1. Next in step (IV), when the target tool 3 is clamped, the tool changing arm 2 rotates from the spindle position 2b back to the stand by position 2a, which is illustrated as step (IV) in FIG. 1, such that the tool changing operation is complete.

Further, FIG. 2 includes a spindle position timing diagram 4 (pointed by the arrow 4), a tool changing arm rotation timing diagram 5 (pointed by the arrow 5), and the tool changing arm movement timing diagram 6 (pointed by the arrow 6). The convention power source of the tool changing arm 2 is a cam and a motor, wherein the motor drives the cam, and the cam triggers the movement of the tool changing arm 2. After the spindle moving back and stopping at the original point A, the tool changing arm 2 is controlled to rotate from the stand by position 2a to the spindle position 2b. Next, during the cam rotating in a 20 degrees ceasing angle, the motor shall be braked to stop. When the power source finishes the tool unclamping motion B of the spindle, the tool changing arm 2 pulls the used tool 1 away. After the tool changing arm 2 rotationally moving, and the target tool 3 being inserted into the spindle, the motor shall be braked to stop, such that the cam stops to rotate in another 20 degreed ceasing angle, during which the tool clamping motion C is finished. Next, the motor again drives the tool changing arm 2 to rotate back to the stand by position 2a, such that the cam is braked to stop in the 20 degrees ceasing angle of the original point A, and the subsequent procedures are carried out. In FIG. 2, the spindle position timing diagram 4 is affected by the cam of the power source of the tool changing arm.

However, regarding in a 360 degrees rotation of the cam for carrying out a tool changing operation, the cam rotation consumes two ceasing section upon the tool unclamping motion B and the tool clamping motion C, respectively, such that the tool changing duration is extended. Also, for cooperating the tool unclamping motion B and the tool clamping motion C, the operation curve of the cam is limited, causing the increase of noise and abrasion and decreasing the service life. Further, for controlling the cam to drive the tool changing arm 2, the motor controls three respective operation motions, including the ceasing motion at the original point A, the tool unclamping motion B, and the tool clamping motion C. In other words, during a signal tool changing operation, the motor is activated and deactivated for three times, respectively. As a result, the tool changing duration is increased. Also, burden upon the motor is increased, and the service life of the motor is decreased.

SUMMARY OF THE INVENTION

For improving the issues above, a tool changing method with pre-unclamping process is disclosed. Prior to the tool changing operation after a processing operation, the clamp end of the spindle is controlled to move the tool to a pre-unclamping position, and the tool clamping and unclamping cylinder pushes the tool, such that the tool leaves the taper of the spindle. Therefore, the tool changing arm successively completes the rotation and movement of the tool changing operation, so as to reduce the time duration for waiting the tool unclamping motion and the tool clamping motion, accelerating the tool changing operation for efficiently changing the tool.

For achieving the aforementioned objectives, a tool changing method with pre-unclamping process in accordance with an embodiment of the present invention is provided for controlling the operation of the spindle, the tool clamping and unclamping cylinder, and the tool changing arm, wherein the first power source controls the spindle to drive the tool for processing; the second power source controls the tool clamping and unclamping cylinder to drive a clamp end of the spindle to clamp the tool at a clamping position; the third power source controls the tool changing arm to change the tool. The tool changing method with pre-unclamping process includes following steps:

(a) a tool pre-unclamping step: before the third power source controls the tool changing arm to change a used tool, the second power source controlling the tool clamping and unclamping cylinder to drive the clamp end of the spindle to move the used tool from a clamping position to a pre-unclamping position; the second power source controlling a tool clamping and unclamping cylinder to push the used tool to leave a taper of the spindle, and the second power source controlling the tool clamping and unclamping cylinder to retract for a retraction distance, such that the used tool re-contacts the clamp end;

(b) a tool changing step, the third power source controlling the tool changing arm to rotate to clamp the used tool and pull the used tool away from the clamp end of the spindle, and the third power source again controlling the tool changing arm to rotate to align a target tool with the clamp end of the spindle; and (c) a tool inserting step, the third power source controlling the tool changing arm to insert the target tool into the clamp end of the spindle, such that the clamp end of the spindle clamps the target tool upon the target tool being inserted.

After a processing operation, the used tool is clamped in a slightly relaxed manner at the pre-unclamping position, so as to prevent the used tool from falling. When the tool changing arm operates, the used tool is directly clamped by the tool changing arm to be removed, thus shortening the duration for waiting the tool unclamping operation. Also, when the used tool is inserted into the tool clamping and unclamping cylinder, the tool clamping and unclamping cylinder directly clamps the target tool without consuming the time duration needed by conventional tool clamping motion, thus accelerating the tool changing operation.

Further, the third power source successively controls the fluent operation of the tool changing arm, so as to resolve the pause and time consumption of conventional tool changing procedure, thus improving the stability of the tool changing operation and increasing the service life of the third power source.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Figure 3:
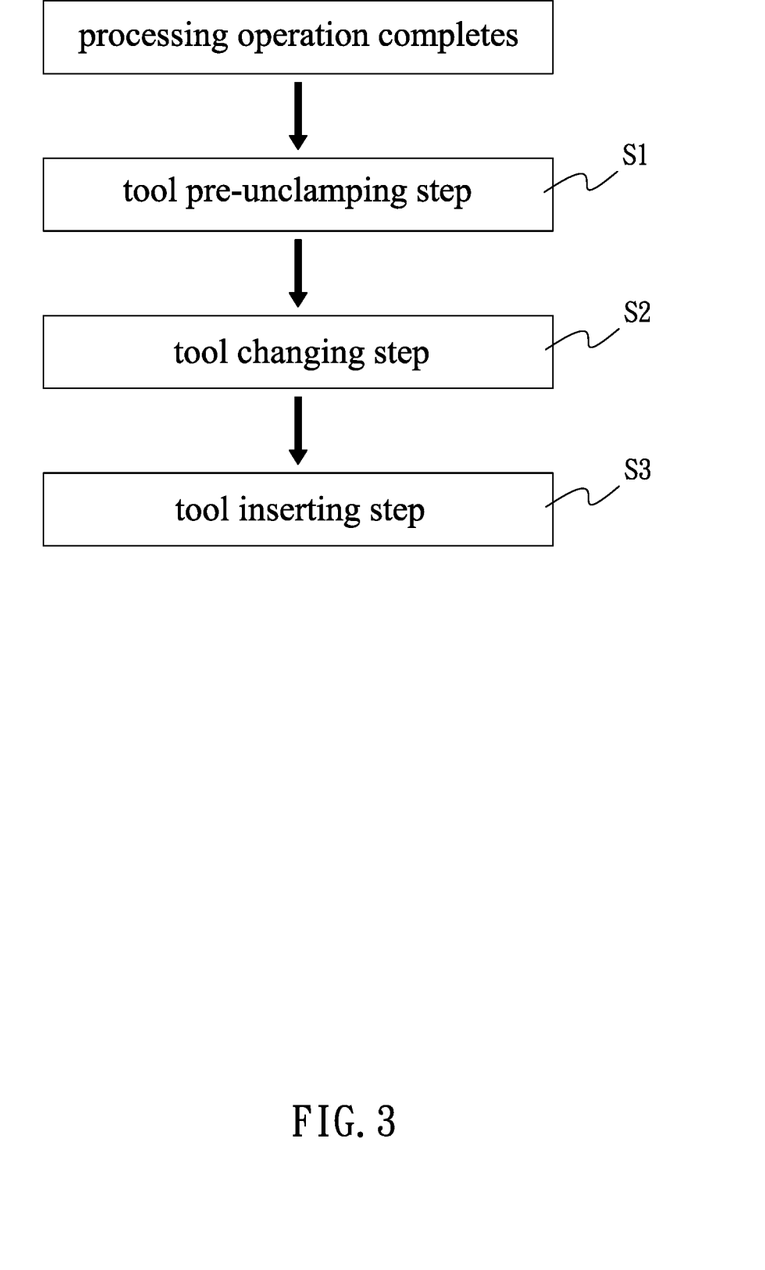
FIG. 3 is the flow chart illustrating the tool changing method in accordance with the embodiment of the present invention.
Figure 4:
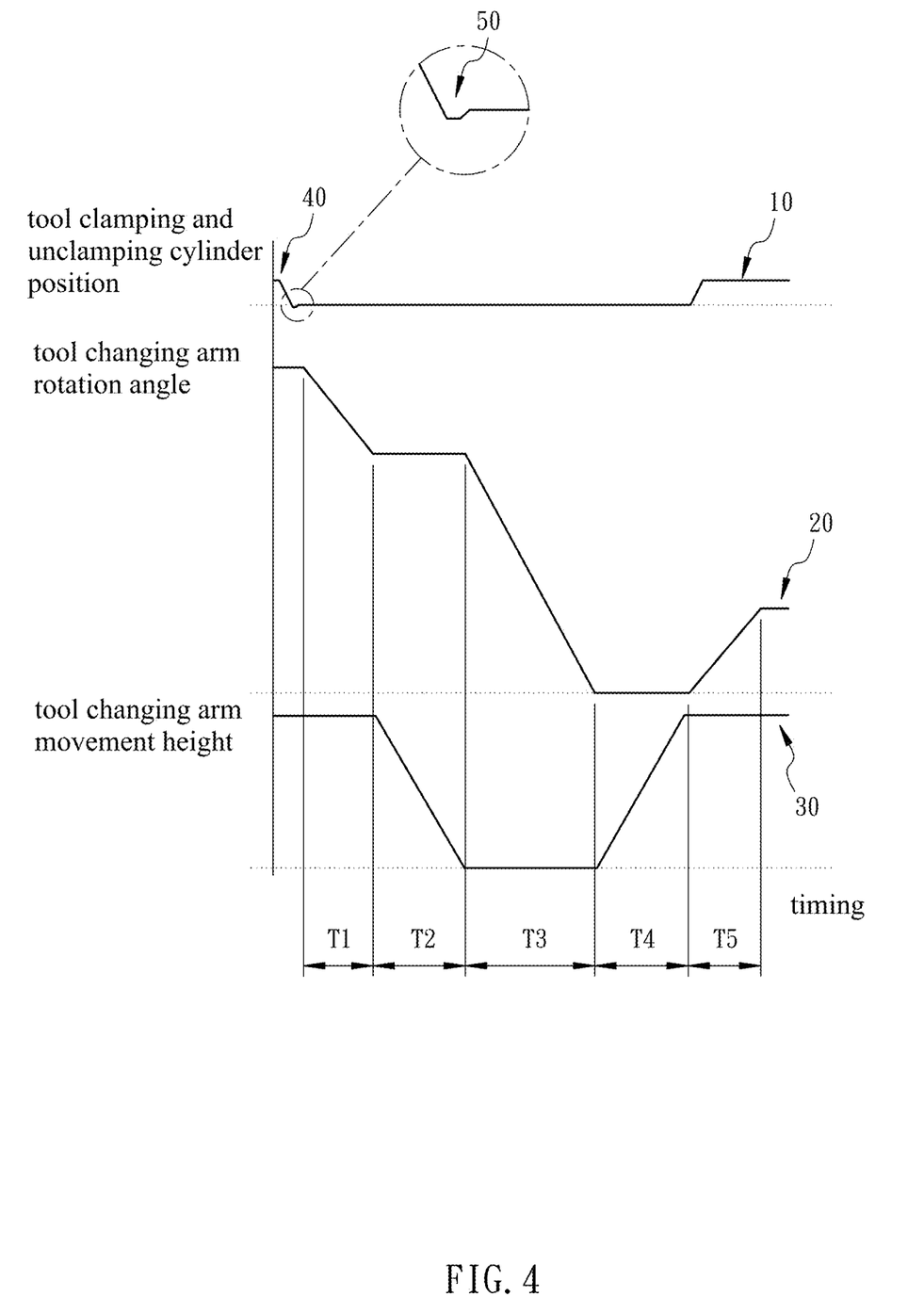
FIG. 4 is a timing diagram of the tool changing method in accordance with the embodiment of the present invention.
Figure 5:
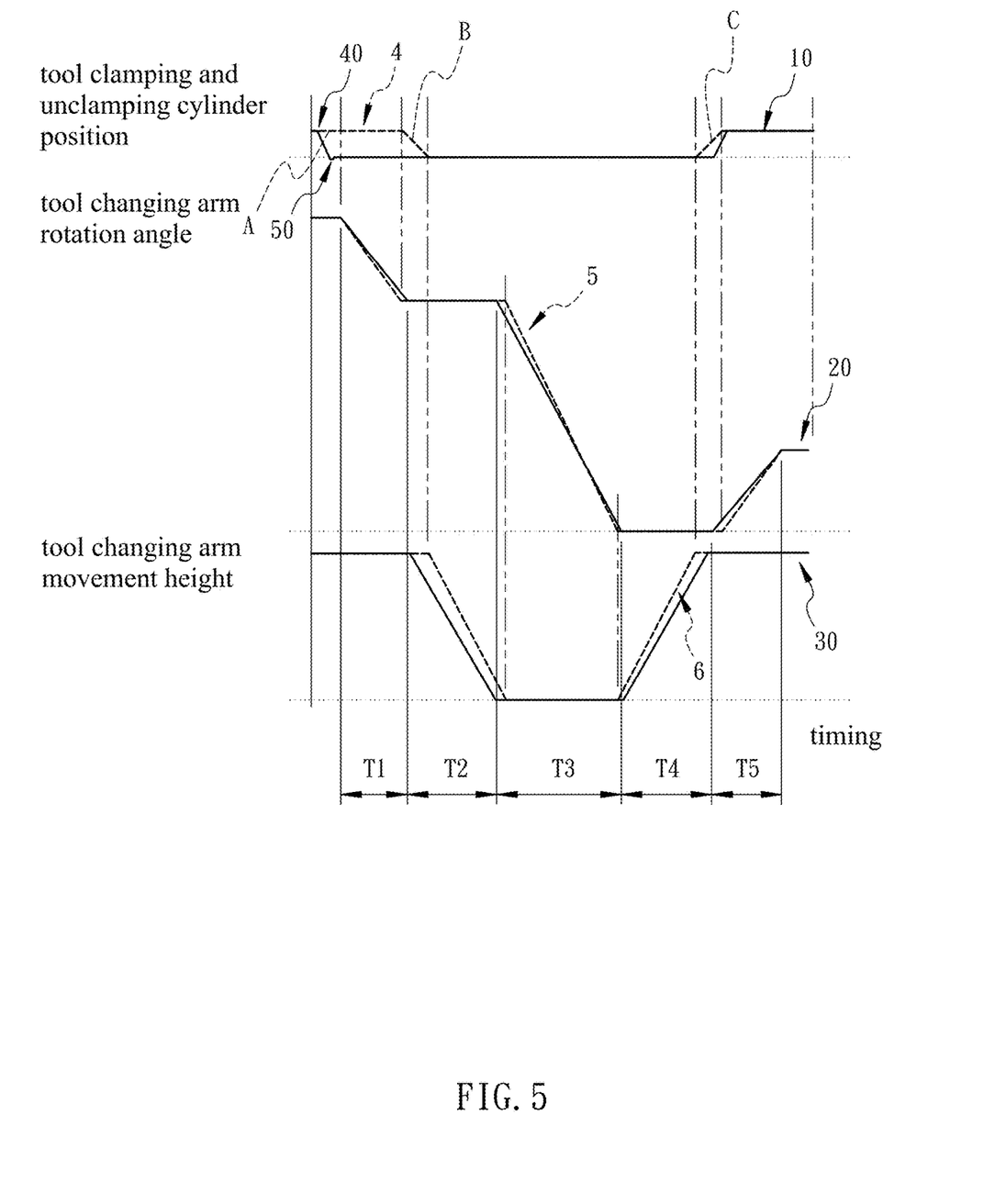
FIG. 5 is a comparison of the timing diagrams between the conventional tool changing method and the tool changing method in accordance with the embodiment of the present invention.
Figure 6:
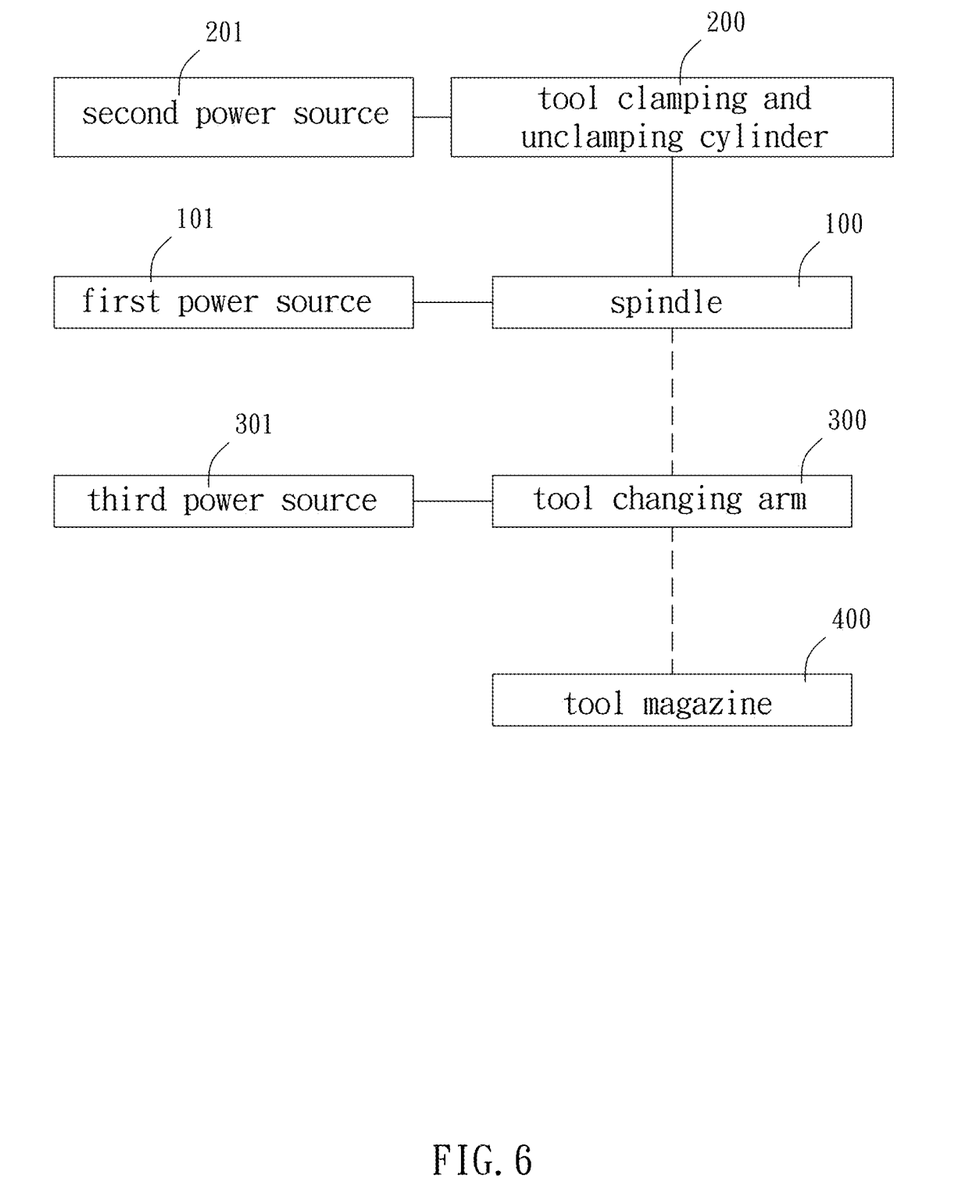
FIG. 6 is a block diagram illustrating the structure of the present invention.

Referring to FIG. 3 to FIG. 6, a tool changing method with pre-unclamping process in accordance with an embodiment of the present invention is provided for the operations of the spindle 100, the tool clamping and unclamping cylinder 200, and the tool changing arm 300. The first power source 101 controls the spindle 100 to carry out the processing operation upon a workpiece with the tool. The second power source 201 controls the tool clamping and unclamping cylinder 200 to drive a clamp end of the spindle 100 to clamp the tool at a clamping position, wherein the clamp end of the spindle 100 is provided with a taper, such that with the self-adherence force of the taper, the tool is tightly engaged with the clamp end of the spindle 100 at the clamping position through the taper of the clamp end, so as to be stably clamped. After the processing operation, the second power source 201 controls the tool clamping and unclamping cylinder 200 to push the tool, such that the tool leaves the taper of the spindle 100. Next, the third power source 301 controls the tool changing arm 300 to change the tool. The first power source 101 is a motor, the second power source 201 is a pneumatic or hydraulic force, and the third power source 301 is a motor-driven cam. In the embodiment, the second power source 101 is a pneumatic force. FIG. 3 to FIG. 5 illustrate a tool clamping and unclamping cylinder timing diagram 10 (pointed by arrow 10), a tool changing arm rotation timing diagram 20 (pointed by arrow 20), and a tool changing arm movement timing diagram 30 (pointed by arrow 30).

The tool changing method with pre-unclamping process in accordance with the embodiment of the present invention includes following steps: a tool pre-unclamping step S1, a tool changing step S2, and a tool inserting step S3.

In the tool pre-unclamping step S1, after a processing operation is finished and before the third power source 301 controls the tool changing arm 300 to change the tools, during the first power source 101 controlling the spindle 100 to move from the processing position to the tool changing position, the second power source 201 controls the tool clamping and unclamping cylinder 200 to drive the clamp end of the spindle 100 which clamps the used tool to move from the clamping position to a pre-unclamping position 40. Next, the second power source 201 controls the unclamping shaft of the tool clamping and unclamping cylinder 200 to push the used tool, such that the used tool leaves the taper of the spindle for removing the self-adherence force of the taper. Next, the second power source 201 controls the tool clamping and unclamping cylinder 200 to retract for a retraction distance 50, wherein the retraction distance 50 is defined as the axial distance along the axial direction of the spindle 100.

Referring to FIG. 3 to FIG. 6, the pre-unclamping position 40 is pointed by the arrow 40 on the tool clamping and unclamping cylinder timing diagram, and the retraction distance 50 is pointed by the arrow 50 on the tool clamping and unclamping cylinder timing diagram 10. In an embodiment of the present invention, the processing position is defined as the position where the spindle 100 carries the tool to process the workpiece; the tool changing position is defined as the position wherein the spindle 100 carries the tool back to the original point for waiting tool changing arm 300 to carry out the tool changing operation.

Also, the clamping tightness of the clamp end at the clamping position is greater than the clamping tightness of the clamp end at the pre-unclamping position 40. More particularly, the clamping position is the position wherein the clamp end of the spindle 100 stably and completely clamps the tool; the pre-unclamping position 40 is the position wherein the clamp end of the spindle 100 clamps the tool with a relatively relaxed tightness, such that the tool is prevented from directly detached from the clamp end. In other words, the clamp end of the spindle 100 is provided with a taper. At the clamping position, the taper of the spindle 100 increases the clamping force of the clamp end upon the tool. At the pre-unclamping position 40, the tool is pushed by the tool clamping and unclamping cylinder 200, such that the tool leaves the taper of the clamp end of the spindle 100 for removing the self-adherence force of the taper, instead of being directly detached from the clamp end. When the tool clamping and unclamping cylinder 200 drives the spindle 100 to retract for the retraction distance 50, the used tool will re-contact the clamp end of the spindle 100, so as to be maintained stably combined with the clamp end of the spindle 100 for bearing the impact caused at the tool removing moment.

Further, at the tool pre-unclamping step, the tool magazine 400 housing a plurality of processing tools is ready. The tool changing arm 300 includes a first end for clamping a target tool from the tool magazine 400 and a second end for clamping the used tool. More particularly, during the first power source 101 controlling the spindle 100 to move from the processing position to the tool changing position, the second power source 200 simultaneously controls the tool clamping and unclamping cylinder 200 to drive the clamp end of the spindle 100, which clamps the used tool, to move from the clamping position to the pre-unclamping position

40. During such operation of the first power source 101 and the second power source 201, the tool magazine 400 opens to be ready for the tool changing step S2.

In the tool changing step S2, after the tool pre-unclamping step S1, the third power source 301 controls the tool changing arm 300 to rotate from the start position, such that the second end of the tool changing arm 300 clamps the used tool, and the first end of the tool changing arm 300 clamps the target tool. When the second end pulls the used tool away from the clamp end of the spindle 100, the first end pulls the target tool away from the tool magazine 400. Next, the third power source 301 controls the tool changing arm 300 to rotate again, such that the first end of the tool changing arm 300 positions the target tool in alignment with the clamp end of the spindle 100.

Referring to FIG. 3 to FIG. 5, in the tool changing arm 300 rotation timing diagram 20 and the tool changing arm movement timing diagram 30, the motion timing of the tool changing arm rotating and clamping the used tool is defined as a first timing T1; the motion timing of the used tool being pulled away from the clamp end of the spindle 100 is defined as a second timing T2; and the motion timing of the tool changing arm 300 rotating and aligning the tool with the clamp end of the spindle 100 is defined as a third timing T3.

In the embodiment of the present invention, the tool changing arm 300 includes a rotation axle, and the third power source 301 controls the tool changing arm 300 to rotate with the rotation axle as the rotation center. Also, the third power source 301 is allowed to control the tool changing arm 300 to reciprocate along an axial direction of the rotation axle. Therefore, when the tool changing arm 300 needs to pull the used tool away from the clamp end of the spindle 100, the third power source 301 controls the tool changing arm 300 to move away from the clamp end along the axial direction of the rotation axle, so as to pull the used tool away from the clamp end of the spindle 100.

In the tool inserting step S3, the third power source 301 controls the tool changing arm 300 to move toward the clamp end of the spindle 100 along the axial direction of the rotation axle, so as to insert the target tool into the clamp end of the spindle 100, such that the clamp end clamps the target tool upon the target tool being inserted into the clamp end. Next, the third power source 301 controls the tool changing arm 300 to rotate back to the start position. When the target tool is inserted into the clamp end of the spindle 100, the structure of the clamp end automatically clamps the target tool; alternatively, the second power source 201 controls the tool clamping and unclamping cylinder 200 to drive the clamp end of the spindle 100 to clamp the target tool. Referring to FIG. 3 to FIG. 6, in the tool changing arm rotation timing diagram 20 and the tool changing arm movement timing diagram 30, the motion timing of the tool changing arm 300 inserting the target tool into the clamp end of the spindle 100 is defined as a fourth timing T4; and the motion timing of the tool changing arm 300 rotating back to the start position is defined as a fifth timing T5.

Further referring to FIG. 3 to FIG. 6, from the tool changing step S2 to the tool inserting step S3, the third power source 301 successively controls the operation of the tool changing arm 300. More specifically, the tool pre-unclamping step S1 relaxes the used tool in advance. Therefore, upon the beginning of the tool changing step S2, the third power source 301 is allowed to successively pull the used tool away from the clamp end of the spindle 100 without the need of waiting for tool unclamping process, and continue to insert the target tool into the clamp end of the spindle 100.

Therefore, after a processing operation and before the tool changing operation, the used tool is relaxed with respect to the clamp end at the pre-unclamping position 40 but not directly detached from the clamp end. Subsequently, the tool changing arm 300 is allowed to move to directly clamp the used tool for pulling the used tool away from the clamp end. Also, when the target tool is inserted into the spindle 100, the clamp end of the spindle 100 directly clamps the target tool. Thus, the tool unclamping and clamping processes are accelerated, increasing the efficiency of the tool changing operation and achieving the fast changing function.

Further, the third power source 301 in the embodiment of the present invention successively controls the operation of the tool changing arm 300, improving the stability of the tool changing operation and increasing the service life of the third power source 301.

In addition, referring to FIG. 5, the curve slope in the tool clamping and unclamping cylinder position timing diagram 10, the tool changing arm rotation timing diagram 20, and the tool changing arm movement timing diagram 30 in accordance with the embodiment of the present invention is smaller than the respective corresponding curve slope of the spindle position timing diagram 4, the tool changing arm rotation timing diagram 5, and the tool changing arm movement timing diagram 6 of the conventional technique. Therefore, the tool changing operation is more stable and efficient. Also, the noise and abrasion during the tool changing operation is lowered.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A fast tool changing method with pre-unclamping step for controlling operations of a spindle, a tool clamping and unclamping cylinder, and a tool changing arm, with a first power source controlling the spindle to carry out a processing operation with a tool; a second power source controlling a tool clamping and unclamping cylinder to drive a clamp end of the spindle to clamp the tool at a clamping position, wherein the tool is tightly engaged with a taper of the clamp end of the spindle, such that, because of a self-adherence force of the taper, the tool is stably clamped and unable to be removed by the tool changing arm from the spindle; and a third power source controlling the tool changing arm to change the tool, the fast tool changing method with pre-unclamping step including following steps:

(a) a tool pre-unclamping step: before the third power source controlling the tool changing arm to change a used tool, the second power source controlling the tool clamping and unclamping cylinder to push the used tool, the clamp end of the spindle moving from the clamping position to a pre-unclamping position, and a self-adherence force between the used tool and a taper of the spindle being removed, then the second power source controlling the tool clamping and unclamping cylinder to retract for a retraction distance, with the used tool re-contacting the clamp end;

(b) a tool changing step, after the tool pre-unclamping step by which no self-adherence force exists between the used tool and the spindle, the third power source controlling the tool changing arm to rotate to clamp the used tool and simultaneously pull the used tool away from the clamp end of the spindle, and the third power source again controlling the tool changing arm to rotate to align a target tool with the clamp end of the spindle; and (c) a tool inserting step, after the tool changing step by which the target tool is in alignment with the clamp end of the spindle, the third power source controlling the tool changing arm to insert the target tool into the clamp end of the spindle, the second power source controlling the tool clamping and unclamping cylinder to drive the clamp end of the spindle to clamp the target tool upon the target tool being inserted.

2. The method of claim 1, wherein a clamping tightness of the clamp end at the clamping position is greater than the clamping tightness of the clamp end at the tool pre-unclamping position.

3. The method of claim 1, wherein in the tool pre-unclamping step, a tool magazine is ready for providing the target tool.

4. The method of claim 3, wherein in the tool changing step, an end of the tool changing arm clamps the target tool.

5. The method of claim 1, wherein from the tool changing step to the tool inserting step, the third power source controls the successive operation of the tool changing arm.

6. The method of claim 1, wherein the retraction distance is defined as an axial distance along an axial direction of the spindle.

* * * * *